United States Patent [19]

Hayashi et al.

[11] Patent Number: 4,684,008
[45] Date of Patent: Aug. 4, 1987

[54] APPARATUS AND METHOD FOR ARRAYING AND CONVEYING ROWS OF PRODUCTS

[75] Inventors: Torahiko Hayashi, Utsunomiya; Etsuo Ota, Kanuma, both of Japan

[73] Assignee: Rheon Automatic Machinery Co., Ltd., Japan

[21] Appl. No.: 767,496

[22] Filed: Aug. 20, 1985

[51] Int. Cl.⁴ .............................................. B65G 47/26
[52] U.S. Cl. ...................................... 198/436; 198/431
[58] Field of Search .............. 198/577, 579, 429, 431, 198/631, 812, 588, 586, 589, 420, 424, 436, 462, 427, 601, 439, 437

[56] References Cited

U.S. PATENT DOCUMENTS

| | | | |
|---|---|---|---|
| 3,106,280 | 10/1963 | Baker | 198/424 X |
| 3,324,987 | 6/1967 | Kiesser | 198/424 X |
| 4,155,441 | 5/1979 | Albrecht et al. | 198/431 X |
| 4,256,434 | 3/1981 | Stodt et al. | 198/436 X |
| 4,553,658 | 11/1985 | Gasser | 198/436 X |

FOREIGN PATENT DOCUMENTS

| | | | |
|---|---|---|---|
| 210696 | 3/1957 | Australia | 198/437 |
| 392947 | 3/1923 | Fed. Rep. of Germany | 198/436 |
| 2601833 | 7/1977 | Fed. Rep. of Germany | 198/369 |

Primary Examiner—Joseph E. Valenza
Assistant Examiner—D. Glenn Dayoan
Attorney, Agent, or Firm—Guy W. Shoup

[57] ABSTRACT

An apparatus and method for arraying and conveying rows of products is provided. The apparatus comprises a first conveyor, a second conveyor, and a third conveyor. The delivery end of the first conveyor is adapted to move forwardly and rearwardly to transfer rows of products onto the second conveyor. The second conveyor is adapted to intermittently move transversely of the conveyance path and receives additional rows of products from the first conveyor and when a sufficient number of rows of products are arrayed on the second conveyor, they are transferred to a third conveyor at a high speed to be carried to a subsequent station. The third conveyor is then restored to a position to receive a fresh rows of products from the first conveyor.

8 Claims, 18 Drawing Figures

APPARATUS AND METHOD FOR ARRAYING AND CONVEYING ROWS OF PRODUCTS

BACKGROUND OF THE INVENTION

1. Field of the Invention

This invention is for an apparatus and method used in the field of food processing. By the use of this apparatus and method, in the course of conveying products from a shaping machine to a processing apparatus such as a band oven, the products being conveyed are arrayed into any desired number of rows or columns in the transverse direction, and the thus arrayed products are fed to the next station.

2. Description of Prior Art

A prior art apparatus previously used for arraying products into a plurality of rows or columns includes, for example, a transverse feeding device such as a push rod or a guide plate mounted on a conveying apparatus. In such a prior art apparatus, a predetermined number of products moving in a line on a conveyor are transferred by the transverse feeding device onto another conveyor positioned below the first conveyor and at right angles thereto, and this operation is repeated to array the products into a predetermined number of rows or columns.

However, in the prior art apparatus as described above, the size and shape of products which can be handled by such apparatus are limited. Therefore, in order to array a variety of products into a desired number of rows or columns, guide plates and other parts must be replaced or adjusted at each time a new type of product is to be handled which results in great inconvenience.

SUMMARY OF THE INVENTION

It is an object of the present invention to provide an apparatus and method by which products of any shape can be arrayed without requiring a troublesome operation as described above, and the step of conveying the products from a shaping machine to a processing apparatus such as a band oven is fully automated, resulting in an improvement of the product processing ability at reduced costs. It is another object of the present invention to provide an apparatus and method to array any desired number of rows or columns of products while being conveyed. A further object of the present invention is to provide an apparatus and method to handle and array products liable to buckle, such as bar-shaped dough products, during transfer between conveyors without deforming the products. In one aspect of the present invention, it provides an apparatus for arraying and conveying products, which comprises a first conveyor successively feeding at least one row of material, the delivery end portion of said first conveyor being adapted to reciprocally extend and retract, a second conveyor disposed beneath and opposite to the delivery end portion of said first conveyor, and adapted to be driven at variable speeds and also driven forwardly and rearwardly and intermittently movable in the transverse direction, and a third conveyor disposed downstream fo the second conveyor and adapted to be driven at variable speeds for conveying rows of products onto a subsequent station.

In another aspect of the present invention, it provides a method of arraying products, which comprises:

(1) transferring a predetermined length of at least one row of products successively conveyed on a first conveyor, onto a temporarily stopped second conveyor, positioned underneath the first conveyor, by retracting the delivery end portion of said first conveyor, (2) advancing said delivery end portion of the first conveyor to a location at which the transfer begins, while transversely moving said second conveyor by a predetermined length, (3) transferring a predetermined length of at least one subsequent row of products from said first conveyor onto said second conveyor in the same manner as in (1), (4) restoring the second conveyor to the location in alignment with the other conveyors, transferring the thus arrayed plurality of rows of products onto a third conveyor, positioned downstream of the second conveyor, by driving the second conveyor and the third conveyor at the same high speed, and (5) transferring the arrayed rows of products onto a subsequent station.

The arraying and conveying apparatus of the present invention is in most cases disposed downstream of a food-forming machine. Products formed by the food-forming machine are fed on a conveyor in one or more longitudinal lines. Products are then fed onto the arraying device of this invention.

The arraying device consists of a first conveyor and a second conveyor. The first conveyor receives the products from the upstream conveyor and transfers them to the second conveyor positioned underneath the delivery end of the first conveyor. The delivery end is arranged such that it can extend or retract. It may also be arranged so that it can take a horizontal position and a forwardly bent position. When it is lowered, the forward end may come into contact with the upper surface of the second conveyor so that the delivery of products can be facilitated. In order to achieve the above functions, the delivery end may be supported on a movable frame, which can move back and forth on a horizontal level. The delivery end may also be supported by a swingable plate pivoted to the remaining portion of the support for the first conveyor.

The second conveyor stretches underneath and beyond the first conveyor so that it can receive products therefrom and convey them to a third conveyor. The second conveyor is supported by a frame which is intermittently movable in the transverse direction. The first conveyor is constantly driven at a speed which does not obstruct or inconvenience the receipt of products from the upstream conveyor, for instance, at the same speed as the upstream conveyor, and conveys products to the second conveyor. When the products are transferred, the second conveyor is stationary and the delivery end of the first conveyor is fully stretched so that the forward end almost reaches the downstream end of the second conveyor. It may further be lowered to come into contact with the second conveyor. Also, along with the discharge of the products, the delivery end is retracted to a position near the upstream end of the second conveyor. When the delivery end is fully retracted, a batch of the products thereon will have been transferred to the second conveyor. Thereupon, the delivery end starts stretching so that it can keep conveying products thereon. While it is stretched forward, the frame supporting the second conveyor is moved sideways so that the second conveyor is shifted sideways to provide a space for receiving a new row or rows of products. When the delivery end is fully stretched, the same transfer operation is repeated. The second conveyor may be shifted sideways as many times as the space permits. When the second conveyor has received sufficient rows of products, it is reverted to a position in alignment with the other conveyors, thereupon transfers the products at a high speed to the third conveyor. The second conveyor is then ready to receive products from the first conveyor. From this point on, the same procedure as mentioned above will be repeated.

The third conveyor may be run at two different speeds. When the products on the second conveyor are transferred to it, it is run at the same high speed as the second conveyor. Once the products are transferred, it is run at a speed which is inversely proportional to the increase of rows on the first conveyor. When the first conveyor carries only one row and the third conveyor receives 6 rows, then the speed of the third conveyors may be 1/6 of the first conveyor. If the number of rows on the first conveyor is increased to two and if the third conveyor receives 6 rows, the speed of the third conveyor may be ⅓ of the speed of the first conveyor. The products are then transferred to a subsequent station via a conveyor, for instance, a feed-out conveyor. By so arranging the speed of the third conveyor, it becomes possible for the feed-out conveyor to receive and convey the products on continuously if it is run in synchronism with the third conveyor, at the same speed as, or higher than, that of the third conveyor.

When products in the form of elongate bars are handled, it is advantageous to make a modification to the above arrangement. When long products are transferred from the first conveyor to the second conveyor, the second conveyor is made to be driven forward so that the products can be deposited straight on the second conveyor.

BRIEF DESCRIPTION OF THE DRAWINGS

FIG. 2 (A) is a diagrammatic view illustrating the first conveyor and its moving device.

FIG. 2 (B) is an enlarged partially diagrammatic view illustrating a movable frame.

FIGS. 3 (A) and (B) are a plan view and a side elevation view, respectively, of a second conveyor.

FIGS. 4 (A) to (C) are diagrammatic views illustrating the movement of the conveyors during the arraying operation.

FIGS. 5 (A) to (E) are diagrammatic views illustrating the operation for arraying small products.

FIGS. 6 (A) to (E) are diagrammatic views illustrating the operation for arraying bar-shaped products.

DESCRIPTION OF THE PREFERRED EMBODIMENTS

Figure 1:
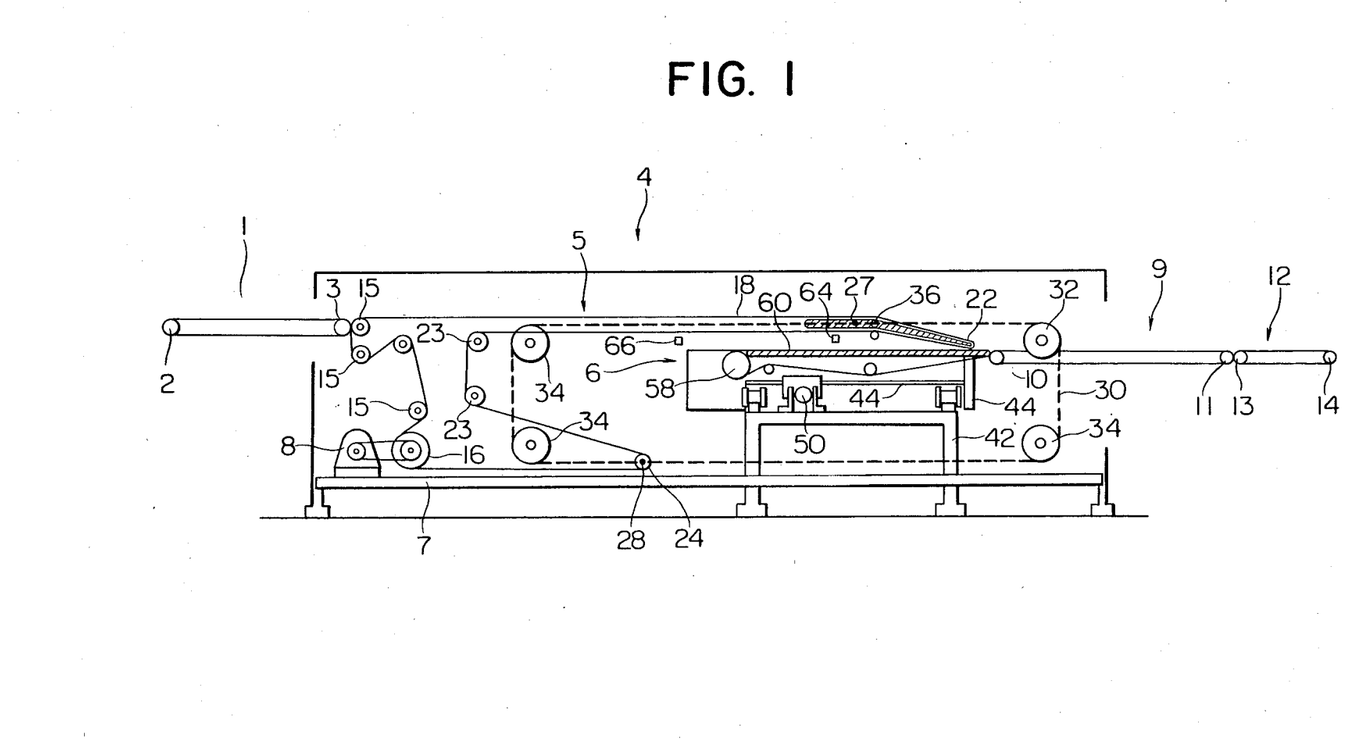
FIG. 1 is a side elevation view of the arraying device of the present invention.
Figure 2A:
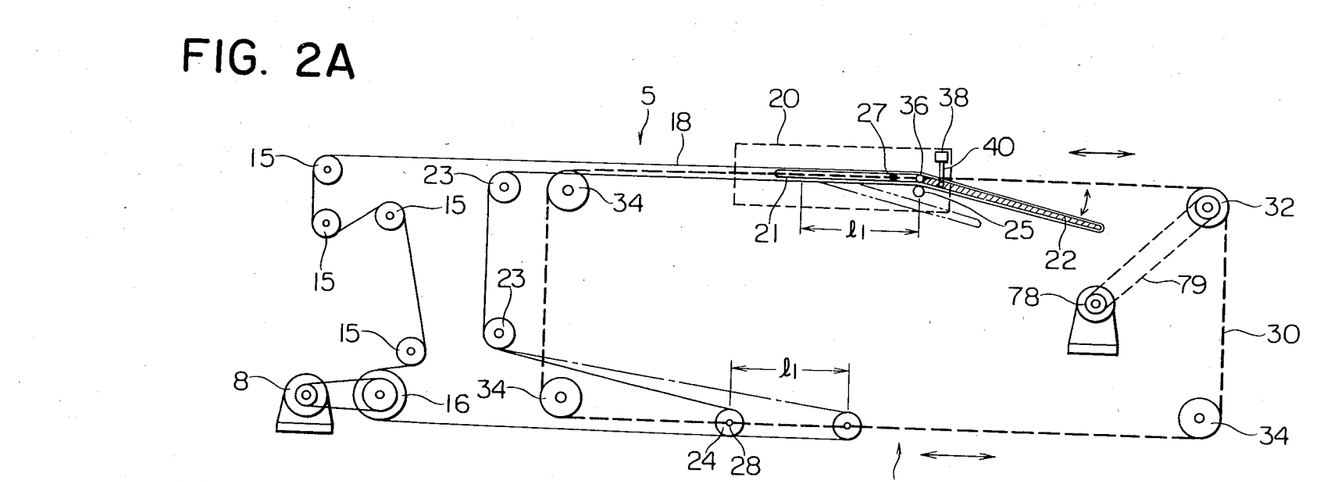
Figure 2B:
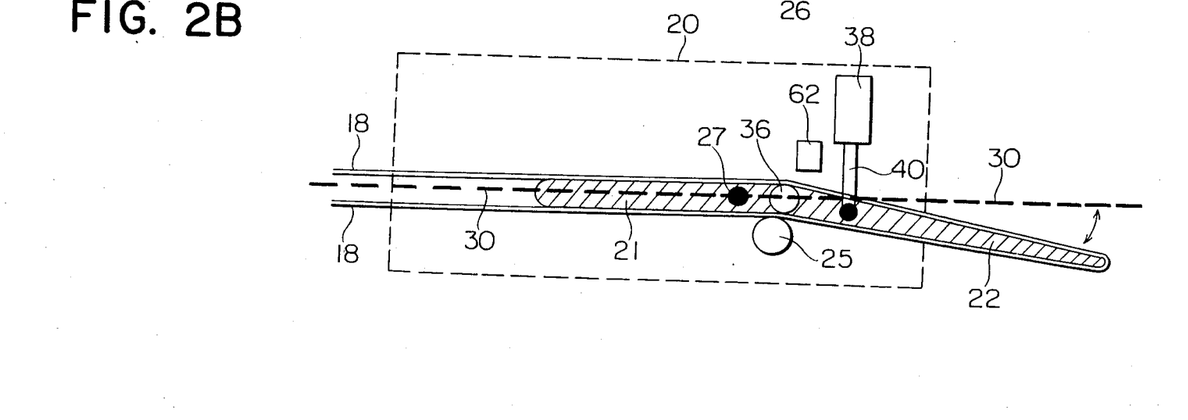

An embodiment of the arraying and conveying apparatus of the present invention will be described with reference to FIGS. 1 to 3. The apparatus of the present invention receives products from a feed-in conveyor 1, having a belt which passes around rollers 2 and 3, connected to a bread or confectionery shaping machine to supply shaped products, and comprises a first and a second conveyor forming part of an arraying device 4, and a third conveyor 9, to deliver the arrayed products to the feed-out conveyor 12. The conveyors 9 and 12 also have belts which pass around rollers 10 and 11, and 13 and 14, respectively.

The arraying device 4 includes a first conveyor 5 and a second conveyor 6.

The arraying device will be described in further detail. The first conveyor 5 is mounted on a frame 7 of the arraying device 4 and includes a belt 18 which is passed around a swingable plate 22 forming the forward end of the first conveyor, a plurality of rollers 15, 23, 24 and a driven roller 16 which is driven by a motor 8 as shown in FIG. 2 (A).

The delivery end of the belt 18 is turned back at the front end of the swingable plate 22, and passes around idle rollers 23 and a horizontally displaceable idle roller 24.

A movable frame 20 is provided near the forward end of the first conveyor and supports a belt-support plate 21 and the swingable plate 22. The swingable plate 22 is hinged to the belt-support plate 21 through a hinge shaft 36 as shown in FIG. 2 (B). The movable frame 20 and the movable roll 24 are arranged so that they are movable back and forth on a horizontal level as shown in FIG. 2 (A), along guides (not shown) provided on the frame 7. The movable frame 20 and the movable roll 24 are joined, at a point 27 and the shaft 28 of the roll 24, respectively, to a chain 30 of a displacing device 26.

The chain 30 is passed around a driven sprocket 32, which is driven through a chain 79 by a motor 78, and sprockets 34 to cause a reciprocating movement of the movable frame 20 and the roll 24 according to the timing required for the transfer of products, and slackening of the belt 18 tending to occur with the movement of the movable frame 20 is compensated for by the reciprocating movement of the movable roller 24. Therefore, these movable members 24 and 20 have the same distance of displacement $l_1$. The swingable plate 22 is further connected to a cylinder 38 through a rod 40. The cylinder 38 can extend or retract the rod 40 so that the swingable plate can make a swinging movement between a horizontal position and a downward tilted position. The swingable plate 22 is progressively thinner toward its front end, and its front end is rounded to ensure a smooth return movement of the belt 18. A phototube 62 to detect the position of a product is provided on the frame 7 and proximity switches 64 and 66, to detect the position of the movable frame 20, are further provided to control the timing of the transfer of products, the reciprocating movement of the movable frame 20, and the swinging movement of the swingable plate 22.

Figure 3A:
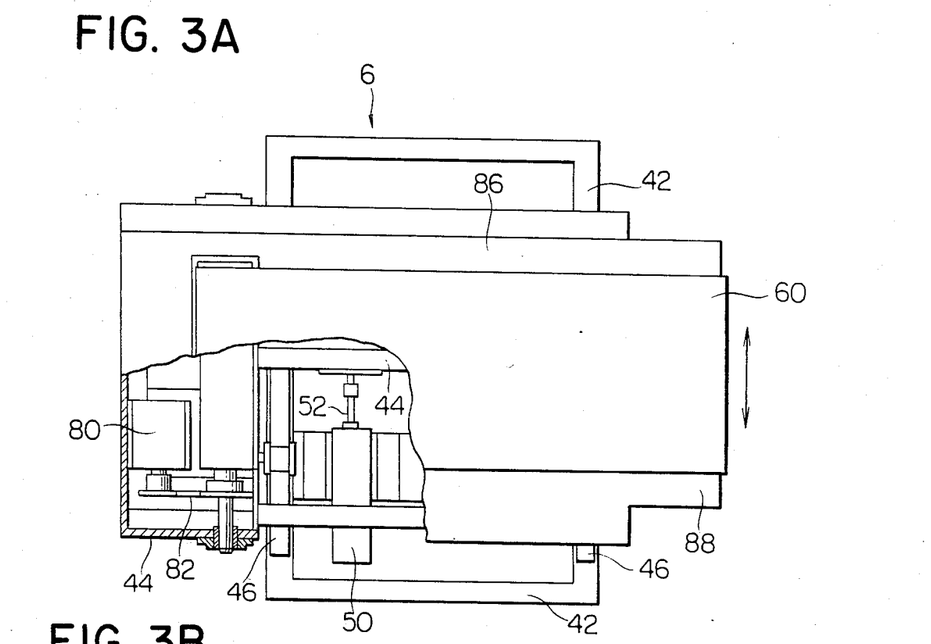
Figure 3B:
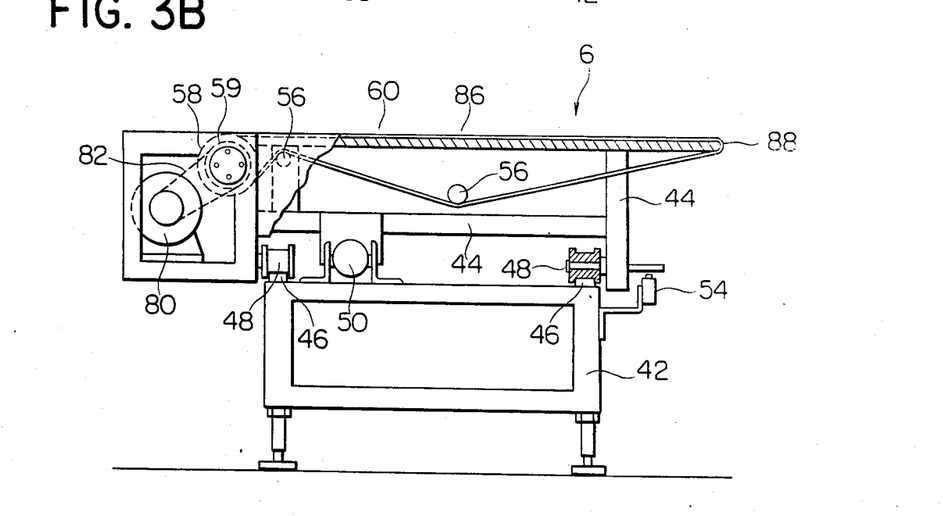

As shown in FIGS. 3 (A) and (B), the second conveyor 6 is mounted on a support 44 and includes a belt 60, a belt-support plate 86, the delivery end is rounded to ensure a smooth return movement of the belt 60, rollers 56, a driver roller 58, which is driven by a motor 80 through a chain 82, and a driven sprocket 59.

Wheels 48 attached to the support 44 are guided on rails 46 mounted on the frame 42. A cylinder 50 is operatively connected via a rod 52 to the support 44 and causes and intermittently transverse movement of the support 44 over a predetermined distance, by extending or retracting a rod 52.

A limit switch 54 controls the distance of movement of the support 44.

The direction of movement of the belt 60, which is passed around rollers 56, the rounded end 88 of the belt-support plate 86, and a driven roller 58, is reversible, and, when the products are in the form of elongate bars, makes a reciprocating movement over a short distance during transfer of such products to ensure stable transfer of the products, as explained below in further detail.

The third conveyor 9 disposed contiguously to the second conveyor 6 is driven at a high speed in synchronism with the belt 60 when it receives the products from the second conveyor 6, while it is driven at a low speed in synchronism with the feed-out conveyor 12 after completion of the transfer of the products. When, for example, the products in each row conveyed by the first conveyor 5 are to be arrayed into three rows, the driving speed of the third conveyor 9 is selected to be ⅓ of the speed of the first conveyor 5, so that the products on the feed-out conveyor 12 can be continuously conveyed in the arrayed condition.

Figure 4A:
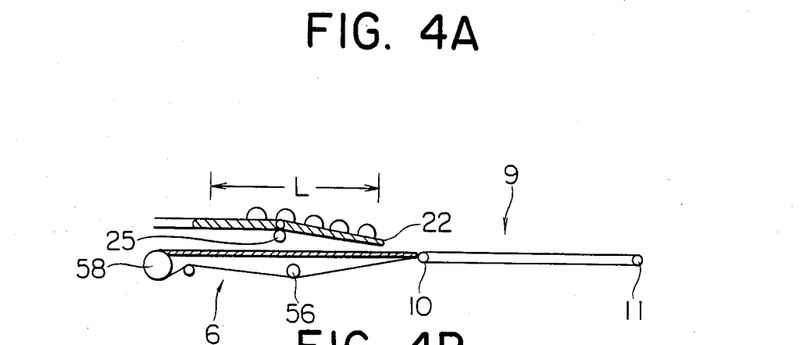
Figure 4B:
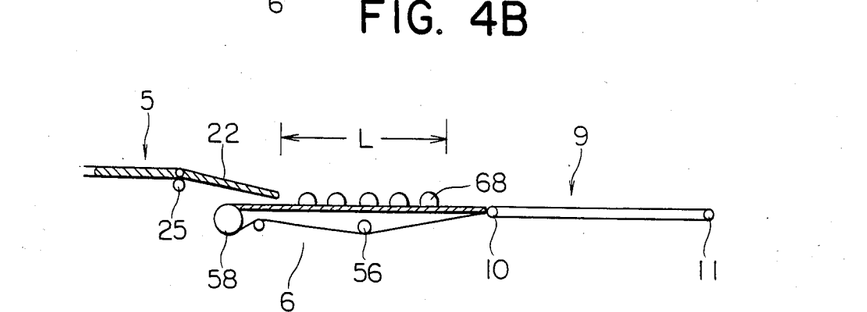

The operation of the arraying device will now be described with reference to FIG. 4. When the products 68 are conveyed by the first conveyor 5, and the leading product is detected by the phototube 62, the swingable plate 22 is tilted downward until its front end approaches the second conveyor 6. At the start of the transfer of a row or rows of products, the delivery end of the first conveyor 5 is fully extended in FIG. 4 (A) to cover almost all of the stretched of the second conveyor 6. In the course of the transfer of the products, the first conveyor 5 is retracted by a stroke L while the second conveyor 6 is stationary. FIG. 4 (B) shows the position of the first conveyor 5 and the transferred products when a cycle of transfer is completed. When the products are bar-shaped, the belt of the second conveyor 6 is advanced by a distance l to prevent buckling or bending of the products. This operation is not neccessarily required when the products are spherical or lump-form.

Figure 4C:
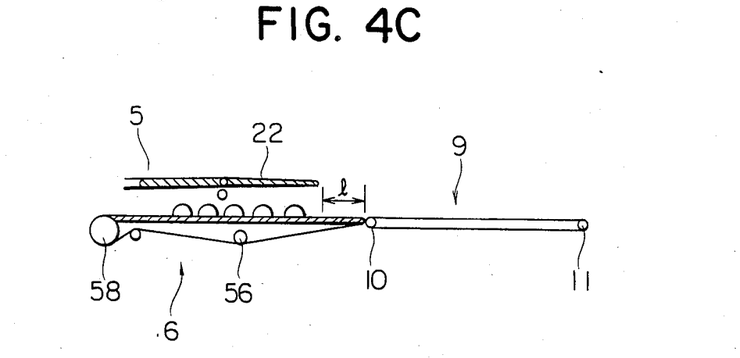

Upon completion of the transfer of the first row, the first conveyor 5 is extended and restored to the original stand-by position, as shown in FIG. 4 (C), to wait for the arrival of the leading product of the next row, in order to repeat the transferring operation.

The manner of arraying the products of spherical, discform, or of a similar shape, by the apparatus of the present invention will be described with reference to FIG. 5.

(1) FIG. 5 (A) illustrates that a first product group A has been transferred onto the third conveyor 9, and the second conveyor 6 stands by ready to start the next arraying operation.

(2) Before the next group of products is conveyed by the first conveyor 5, the second conveyor 6 has been shifted to the position for receiving the first row of the products, which are transferred onto the second conveyor 6, as shown in FIG. 5 (B). When the products are transferred, the first conveyor 5 retreats to allow depositing of the products on the second conveyor which is stationary.

Figure 5A:
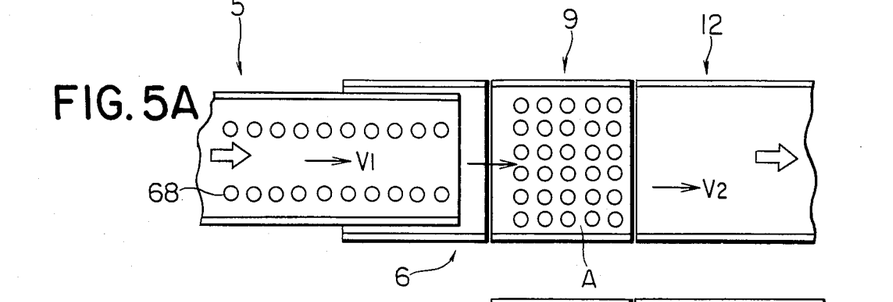
Figure 5B:
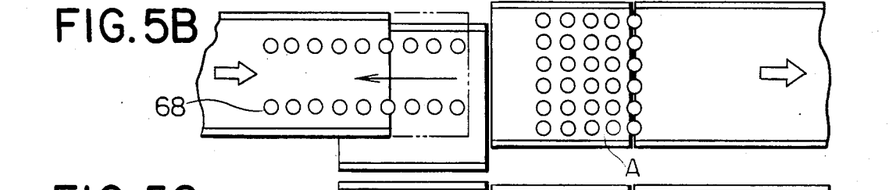
Figures 5C, 5D:
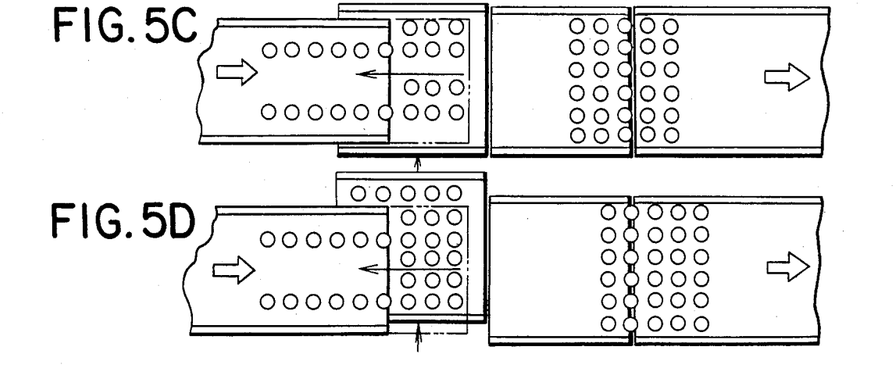

At this time, the third conveyor 9 is driven at the same speed as that of the feed-out conveyor 12 to successively transfer the products of the group A onto the feed-out conveyor 12.

(3) For the transfer of the second row, the second conveyor 6 is shifted in the transverse direction in one step, and the products in the second row are arrayed adjacent to the first row, as shown in FIG. 5 (C).

(4) As shown in FIG. 5 (D), the products in the third row are similarly transferred. These arraying operations are done by the longitudinal movement of the front end of the first conveyor 5 and the transverse shifting of the second conveyor 6.

Figure 5E:
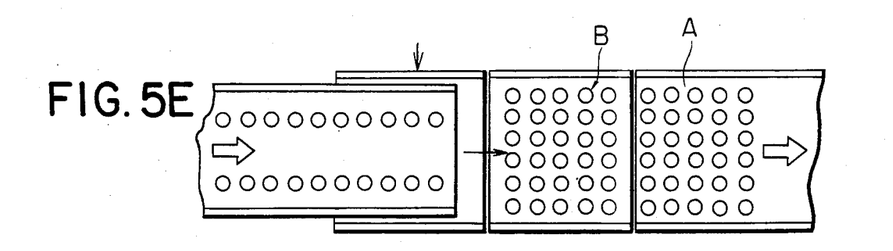

(5) At the time at which the products of the second group B have been completely arrayed, the products of the group A on the third conveyor 9 have been completely transferred onto the feed-out conveyor 12. The second conveyor 6 is now restored to the position aligned with the third conveyor 9. Then, as shown in FIG. 5 (E), the arrayed products of the second group B are transferred at a high speed from the second conveyor 6 onto the third conveyor 9.

Thereafter, the arraying device arrays the products by repeating the operations described in (2) to (5) above, so that the arrayed products are successively transferred from the third conveyor 9 onto the feed-out conveyor to be supplied to a subsequent station.

In the example illustrated in FIG. 5, the relation between the speed $V_1$ of the first conveyor 5 and that $V_2$ of the feed-out conveyor 12 is preferably selected to be $V_1 = 3V_2$ when, for example, the products conveyed in two rows by the first conveyor 5 are arrayed in six rows where the products on the conveyor 12 have the same spacing between them in the longitudinal direction as on the first conveyor 5. Thus, by selecting the respective speeds of the conveyors 5 and 12 in the manner described above, the products can be continuously conveyed without interruption.

An embodiment whereby bar-shaped products are arrayed by the apparatus of the present invention will now be described with reference to FIG. 6.

Bar-shaped products 70, as shown in FIG. 6, are obtained by cutting, in the longitudinal direction, a dough sheet stretched by a dough stretching device, to form webs of dough, folding the dough webs in the transverse direction to shape them into bar-shaped members, and then cutting the bar-shaped members into products having a predetermined length. Such bar-shaped products are arrayed as follows:

(1) As shown in FIG. 6 (A), webs of dough are transversely folded to form bar-shaped members which are cut into a predetermined length to form a plurality of rows (A or D) of bar-shaped products 70 which are conveyed by the first conveyor 5.

(2) As in the case of the spherical products 68 described already, the bar-shaped products (A−1, B−1, ...) are transferred from the first conveyor 5 onto the second conveyor 6. In this case, the second conveyor 6 has been shifted in the transverse direction to deal with the transfer of the products 70 and, during this transfer, the belt 60 of the second conveyor 6 is advanced by the distance l at the same speed as that of the belt 18 of the first conveyor 5, as shown in FIG. 4, so that buckling or bending of the bar-shaped products 70 does not occur.

Figure 6A:
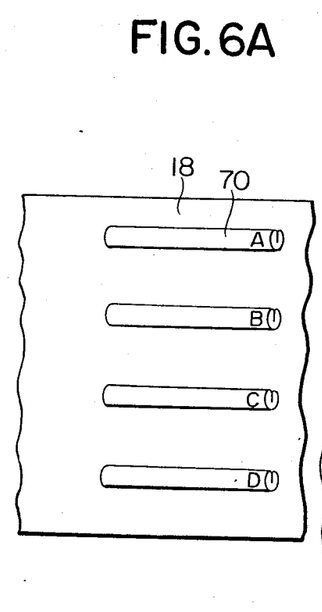
Figure 6B:
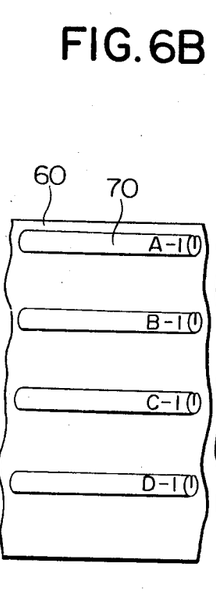

(3) After the transfer of the products 70 has been completed by the movement of the movable frame 20 by the stroke L, it is detected by the proximity switch 66, and the retracting movement of the frame 20 is stopped. Then, the swingable plate 22 is swung to its horizontal position, and the movable frame 20 is advanced.

(4) The proximity switch 64 detects the end of the movement of the movable frame 20 to stop it.

(5) In response to the signal indicative of the stop of the movable frame 20, the second conveyor 6 is shifted in the transverse direction to make room for the receipt of additional rows of the bar-shaped products. The stop position in that case is controlled by the limit switch 54.

(6) The belt 60 of the second conveyor 6 is retracted by the distance 1 to stand by at the position at which the leading ends of the bar-shaped products (A−2, B−2, ...) in the second group register with those of the first group.

(7) Then, the products of the second group are transferred as shown in FIG. 6 (C).

Figure 6C:
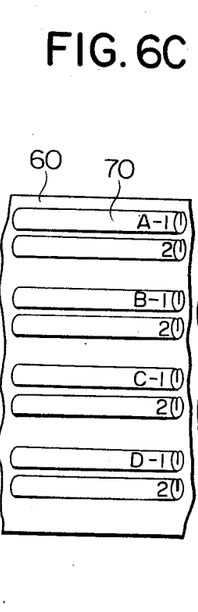
Figure 6D:
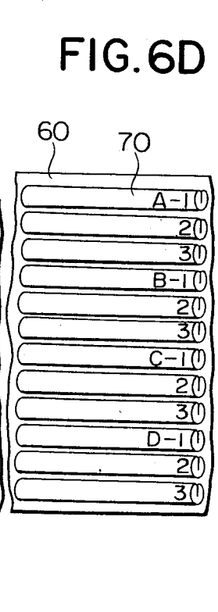

(8) The products of the second group and those (A−3, B−3, ...) of the third group are transferred according to the sequential order of (2) to (5) described above.

Figure 6E:
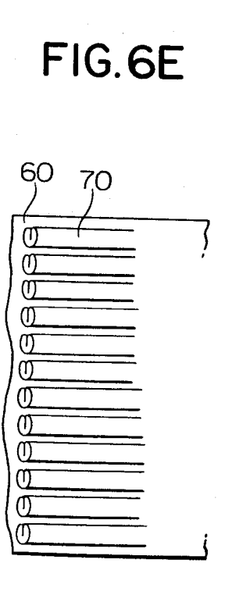

(9) After the bar-shaped products of the third group have been completely transferred, the second conveyor 6 is restored to the delivering position, and then the belt 60 is driven at a high speed to transfer the arrayed bar-shaped products onto the third conveyor 9.

As described above, the arraying device of the present invention can convey relatively soft and fragile products safely and array the products into predetermined rows in the course of transfer.

When the operations of the above-described individual devices of the apparatus of the present invention are stored in a memory member of a control-purpose microcomputer, and the stored program is used based on the products to be arrayed, various kinds of products can be transferred and arrayed as desired.

In the arraying device of the present invention, arrayed products may be transferred from the third conveyor 9 or second conveyor 6 onto a tray placed on the next conveyor. Further, the products may be transferred from the first conveyor 5 onto a tray placed on the second conveyor 6, and the products may then be handled as arrayed on the tray.

Although the bar-shaped products 70 obtained by forming a dough sheet into bar-shaped members may usually be fed, as they are, into a band oven or the like to heat or bake, they may also be baked after being sliced transversely into thin pieces, to obtain products such as pies. For the production of such pies, the products arrayed into a plurality of rows are introduced into cutters to be sliced into thin pieces. According to the present invention, one slicing operation can produce many pies, thereby greatly improving the efficiency of production.

As described above, the arraying and transferring apparatus of the present invention can safely handle relatively soft and fragile products and can array those products into any desired number of rows. The arraying operations can be entirely automated.

Not only can confectionery, bread, pie dough or the like can be each separately conveyed, but also such products can be arrayed on trays.

Further, when the present invention is applied to an apparatus for making pies or the like, bar-shaped products can be simultaneously supplied in parallel rows to a cutter apparatus so that the processing ability can be greatly improved.

We claim:

1. An apparatus for arraying and conveying rows of products comprising a first conveyor successively feeding at least one row of products in a longitudinal direction, first means for reciprocally extending and retracting a delivery end portion of said first conveyor in the longitudinal direction, a second conveyor disposed beneath and opposite to the delivery end portion of said first conveyor for receiving thereon said at least one row of products transferred by said reciprocating delivery end portion of said first conveyor, second means for driving said second conveyor intermittently in a transverse direction such that said second conveyor can receive at least a second row of products thereon from said reciprocating delivery end portion of said first conveyor, thereby multiplying the number of rows of products arrayed on said second conveyor with respect to the number of rows fed by said first conveyor, a third conveyor disposed downstream of a delivery end portion of the second conveyor for receiving the multiplied rows of arrayed products from said second conveyor, and third mean for driving said third conveyor.

2. An apparatus according to claim 1, wherein the second conveyor is mounted on a support, which is movable by said second means at a high speed in the transverse direction.

3. An apparatus according to claim 1, wherein the third conveyor is driven by said third means at a speed inversely proportional to that of the first conveyor according to the ratio of the number of rows of products on the first conveyor to the number of arrayed rows of products transferred to the third conveyor.

4. An apparatus according to claim 1 adapted to transfer alongated, bar-shaped products from the first conveyor into a matrix of the products arranged in parallel with each other on the second conveyor, wherein the second conveyor is driven by auxiliary driving means at the same speed and in the same direction as that of the first conveyor during the transfer of the elongated products from the first conveyor to the second conveyor.

5. A method of arraying and conveying rows of products comprising:

(1) transferring a predetermined length of at least one row of products successively conveyed on a first conveyor, having a longitudinally retractable delivery end portion, onto a temporarily stopped second conveyor positioned underneath the first conveyor by retracting the delivery end portion of said first conveyor at one transfer position, (2) advancing said delivery end portion of the first conveyor longitudinally to begin a next transfer step, while transversely moving said second conveyor by a predetermined distance to a next transfer position underneath the first conveyor, (3) transferring a predetermined length of at least one subsequent row of products from the first conveyor onto said second conveyor in the same manner as in the transferring step (1), so as to multiply the number of rows of products arrayed on said second conveyor with respect to the number of rows fed by said first conveyor, (4) returning the second conveyor transversely to a location in alignment with a third conveyor disposed downstream of a delivery end portion of the second conveyor, and transferring the thus arrayed plurality of rows of products onto the third conveyor by driving the second conveyor and the third conveyor at the same high speed, and (5) transferring the arrayed rows of products from the third conveyor onto a subsequent station.

6. A method according to claim 5, wherein the returning step (4) of said second conveyor is conducted at a high speed.

7. A method according to claim 5, wherein when transferring the arrayed rows of products, the third conveyor is driven at a speed inversely proportional to that of the first conveyor according to the ratio of the number of rows of products on said first conveyor to the number of arrayed rows of product transferred to the third conveyor.

8. A method according to claim 5 adapted to transfer alongated, bar-shaped products from the first conveyor into a matrix of the products arranged in parallel with each other on the second conveyor, wherein, during the transfer of the elongated products from the first conveyor onto the second conveyor, the second conveyor is driven at the same speed and in the same direction as that of the first conveyor.

* * * * *